US012438248B2

(12) United States Patent
Hörberg et al.

(10) Patent No.: US 12,438,248 B2
(45) **Date of Patent: *Oct. 7, 2025**

(54) WAVEGUIDE INTERFACE AND NON-GALVANIC WAVEGUIDE TRANSITION FOR MICROCIRCUITS

(71) Applicant: Telefonaktiebolaget LM Ericsson (publ), Stockholm (SE)

(72) Inventors: Mikael Hörberg, Torslanda (SE); Yinggang Li, Askim (SE); Ola Tageman, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

This patent is subject to a terminal disclaimer.

(21) Appl. No.: 18/202,428

(22) Filed: May 26, 2023

(65) Prior Publication Data

US 2024/0030581 A1 Jan. 25, 2024

Related U.S. Application Data

(63) Continuation of application No. 17/047,835, filed as application No. PCT/EP2019/058982 on Apr. 9, 2019, now Pat. No. 11,664,569.

(Continued)

(51) Int. Cl.

*H01P 5/08* (2006.01)
*H01P 3/08* (2006.01)
*H01P 3/12* (2006.01)

(52) U.S. Cl.

CPC .................. *H01P 5/08* (2013.01); *H01P 3/08* (2013.01); *H01P 3/12* (2013.01)

(58) Field of Classification Search

CPC ................. H01P 5/08; H01P 3/08; H01P 3/12

See application file for complete search history.

(56) References Cited

U.S. PATENT DOCUMENTS

| | | | |
|---|---|---|---|
| 4,636,753 | A | 1/1987 | Geller et al. |
| 10,381,317 | B2 | 8/2019 | Maaskant et al. |

(Continued)

FOREIGN PATENT DOCUMENTS

| | | | |
|---|---|---|---|
| WO | 2017137224 | A1 | 8/2017 |
| WO | 2018067046 | A1 | 4/2018 |

OTHER PUBLICATIONS

Beuerle , et al., "A Very Low Loss 220-325 GHz Silicon Micromachined Waveguide Technology", IEEE Transactions On Terahertz Science and Technology, vol. 8, No. 2, Mar. 2018, 248-250.

(Continued)

*Primary Examiner* — Samuel S Outten

(74) *Attorney, Agent, or Firm* — Murphy, Bilak & Homiller, PLLC

(57) ABSTRACT

The present invention relates to a metalized waveguide interface (1) for providing a galvanically isolated waveguide connection for a propagating signal, between a standardized waveguide (2) and a, to the standardized waveguide non-compatible, metalized chip-level waveguide (3). The metalized waveguide interface (1) is configured such that a first open-ended quarter wavelength waveguide (31) and a second open-ended quarter wavelength waveguide (32) is obtained along the directions d1 and d2, respectively, when the metalized chip-level waveguide (3) is mounted on the support surface (5). The interface is further configured such that third open-ended quarter wavelength waveguide (33) is obtained between the third surface portion (9) and the metalized chip-level waveguide (3) when the metalized chip-level waveguide (3) is mounted on the support surface (5). The interface (1) further comprises a trench such that a short-circuit half wavelength waveguide (34) is obtained when the metalized chip-level waveguide (3) is mounted on the support surface (5).

20 Claims, 13 Drawing Sheets

Related U.S. Application Data

(60) Provisional application No. 62/659,198, filed on Apr. 18, 2018.

(56) References Cited

U.S. PATENT DOCUMENTS

| | | | | |
|---|---|---|---|---|
| 11,664,569 | B2 * | 5/2023 | Hörberg | H01P 3/12 333/239 |
| 2007/0229182 | A1 | 10/2007 | Gaucher et al. | |
| 2014/0320231 | A1 | 10/2014 | Seler et al. | |

OTHER PUBLICATIONS

Rahiminejad , "Microsystem technology for microwave applications at frequencies above 100 GHz", Department of Microtechnology and Nanoscience Chalmers University of Technology, Göteborg, Sweden, Thesis for the Degree of Doctor of Philosophy, 2016, 1-119.

Zaman , et al., "Wide-Band Slot Antenna Arrays With Single-Layer Corporate-Feed Network in Ridge Gap Waveguide Technology", IEEE Transactions On Antennas and Propagation, vol. 62, No. 6, Jun. 2014, 2992-3001.

* cited by examiner

WAVEGUIDE INTERFACE AND NON-GALVANIC WAVEGUIDE TRANSITION FOR MICROCIRCUITS

TECHNICAL FIELD

The present disclosure relates to the field of waveguide transitions. More particularly, the disclosure pertains to metalized waveguide interfaces for providing a galvanically isolated waveguide connection between a standardized waveguide and a, to the standardized waveguide non-compatible, metalized chip-level waveguide. It further pertains to a corresponding waveguide transition.

BACKGROUND

Millimeter-wave, mmW, applications with frequencies beyond 30 GHz, and especially beyond 100 GHz, is becoming popular as telecommunication systems, vehicle radars and imaging sensors are to be made in frequencies of hundreds GHz either for wide bandwidth or for high resolution. Conventionally, signal transfer (or electromagnetic-wave propagation) between subparts of a mmW-system is realized in waveguide technology. This works well if the physical interface of the subparts is standardized waveguide, WG, flanges where screws can be used to tighten the subparts together. Waveguides standards are e.g. International Electrotechnical Commission, IEC, Electronic Industries Alliance, EIA, and Radio Components Standardization Committee, RCSC.

Utilizing e.g. microelectromechanical system, MEMS, technology, microwave structures can be integrated on a chip level. However, the interface of such microwave structure is not compatible (with respect to e.g. size, geometry or material) with a standard waveguide.

Therefore, it is desirable to have an easy to use, industrial producible waveguide interface capable of connecting a standardized waveguide flange and a non-standardized chip-level waveguide, where a high signal quality is achieved in the transition.

The project leading to this application has received funding from the European Union's Horizon 2020 research and innovation programme under grant agreement No 644039.

SUMMARY

The present disclosure proposes a metalized waveguide interface and a non-galvanic waveguide transition comprising such interface addressing one or more aspect as stated above.

In a first aspect, a metalized waveguide interface for providing a galvanically isolated waveguide connection for a propagating signal, between a standardized waveguide and a, to the standardized waveguide non-compatible, metalized chip-level waveguide is provided. The metalized waveguide interface comprises a support part comprising a support surface for mounting the metalized chip-level waveguide.

The interface further comprises a transition part comprising a first surface portion, a second surface portion, a third surface portion and a fourth surface portion. The fourth surface portion comprises a first rectangular waveguide opening compatible connectable to a waveguide opening of the standardized waveguide. Further, the third surface portion comprises a second rectangular waveguide opening having dimensions comprising a first side, a second side, a third side and a fourth side. The first side and the third side are parallel to each other. The second side and the fourth side are parallel to each other and to the first surface portion and the second surface portion. The fourth side is arranged closest to the second surface portion. Moreover, the dimensions of the second rectangular waveguide opening match dimensions of a waveguide opening of the metalized chip-level waveguide.

In addition, the third surface portion extends in a first direction d1 from the first side and parallel to the fourth side and in a second direction d2 from the third side and parallel to the fourth side, such that a first open-ended quarter wavelength waveguide and a second open-ended quarter wavelength waveguide is obtained along the directions d1 and d2, respectively, when the metalized chip-level waveguide is mounted on the support surface.

Moreover, the third surface portion further extends in a fourth direction d4 from the second side and parallel to the first side, such that a third open-ended quarter wavelength waveguide is obtained between the third surface portion and the metalized chip-level waveguide when the metalized chip-level waveguide is mounted on the support surface.

The interface further comprises a trench comprising a recess in the metalized waveguide interface. The trench extending at least between the first side and the third side and further extending in a direction d3 perpendicular to the second rectangular waveguide opening towards the support part. The recess separates the transition part and the support part, such that a short-circuit half wavelength waveguide is obtained when the metalized chip-level waveguide is mounted on the support surface.

Advantageously, this provides for a solution where a standardized metal waveguide can be connected to a non-compatible chip waveguide without leakage. In other words, waveguides with non-compatible flanges can be connected.

The solution does further not require manual operation. It is suitable for high-volume production. The mounting of the chip-level waveguide may be performed automatically. The proposed solution is also scalable. Further, the provided interface may be non-destructive.

According to further aspects, the metalized waveguide interface further comprises an extended portion comprising an extension of the first surface portion and the transition part, the extended portion extending at least between the first side and the third side and in the direction d3, such that the third open-ended quarter wavelength waveguide comprises a bend.

According to further aspects, the first, the second and the third open-ended quarter wavelength waveguide each has an effective electrical length and wherein the effective electrical length of at least one of the first, the second or the third open-ended quarter wavelength waveguide corresponds to a phase shift of the propagating signal of approximately $\pi/2+n\pi$.

According to further aspects, an effective electrical length of the short-circuit half wavelength waveguide corresponds to a phase shift of the propagating signal of approximately $\pi+n\pi$.

Hence, a connection area with RF-chokes in design is provided to make the interface insensitive for air gaps.

According to further aspects, the short-circuit half wavelength waveguide comprises a bend.

According to further aspects, the metalized waveguide interface further comprises a tapered waveguide between the first waveguide opening and the second waveguide opening.

Advantageously, such solution makes it flexible and adaptable for different MEMS-sizes.

In a second aspect, a waveguide transition comprising at least one of the metalized waveguide interfaces is provided.

Thereby, the same advantages and benefits are obtained for the transition as for the waveguide interface as such.

According to further aspects, the waveguide transition further comprises at least one metalized chip-level waveguide comprising a first surface portion and a second surface portion. The second surface portion comprises a third rectangular waveguide opening with dimensions matching the dimensions of the second waveguide opening of the metalized waveguide interface. In addition, the metalized chip-level waveguide is mounted such that the support surface and the first surface portion of the metalized chip-level waveguide are galvanically connected. Moreover, the second and the third waveguide openings are aligned and facing each other.

The waveguide transition further comprises a gap separating the second surface portion of the metalized chip-level waveguide and the third surface portion of the metalized waveguide interface such that a galvanically isolated waveguide connection is obtained.

By providing an airgap between the two waveguides, potential mechanical stress across the microcircuit is avoided.

In addition, due to the airgap between the two waveguides, mis-match in coefficient of thermal expansion between the two subparts is less critical as compared with interconnection using direct physical contact.

According to further aspects, the propagating signal has a wavelength and wherein the gap is much less than the wavelength.

According to further aspects, the metalized chip-level waveguide is micromachined.

According to further aspects, at least two waveguide interfaces are connected in series.

According to further aspects, at least two chip-level waveguides are connected in series.

Hence, it is proposed a metalized waveguide interface and a waveguide transition where no metal surfaces of the interface (besides the support surface) are assumed to have mechanical connection to the die. Further, an airgap between the interface and the mounted die is accepted. Such solution avoids mechanical stress to be applied to the chip-level waveguide.

Further, the present RF-chokes have the consequence that RF-short boundaries are obtained in the gap, i.e. the propagating electromagnetic field propagates as if the waveguide is not interrupted with an airgap.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 4A shows a cross-section where a metalized chip-level waveguide is present. FIG. 4B shows the cross-section without the chip-level waveguide.

DETAILED DESCRIPTION

Figure 1:
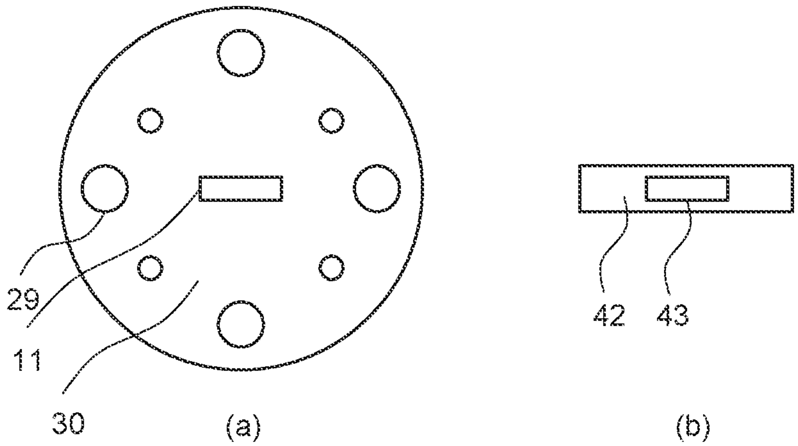
FIG. 1 shows in (a) a cross-section of a standardized metal waveguide flange and in (b) a cross-section of a silicon microcircuit with an embedded waveguide.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Aspects of the present disclosure will be described more fully hereinafter with reference to the accompanying drawings. The apparatus disclosed herein can, however, be realized in many different forms and should not be construed as being limited to the aspects set forth herein. Like numbers in the drawings refer to like elements throughout. The terminology used herein is for the purpose of describing particular aspects of the disclosure only and is not intended to limit the disclosure. As used herein, the singular forms "a", "an" and "the" are intended to include the plural forms as well, unless the context clearly indicates otherwise. For example, "a bend" means that one or more bends may be present.

The disclosed device is a metalized waveguide interface, i.e. a waveguide adapter, and a corresponding waveguide transition. The waveguide interface is to be arranged between a metalized chip-level waveguide and a standardized waveguide where the interface of the chip-level waveguide is non-compatible to the flange of the standardized waveguide with respect to e.g. size, geometry, and material. This is achieved by constructing the metalized waveguide interface such that radio frequency chokes are obtained by cavities between the chip-level waveguide and the waveguide interface when the waveguide opening of the chip-level waveguide and the opening of the waveguide interface are arranged with a galvanically isolated gap in-between each other.

To facilitate the understanding of the waveguide interface, different aspects in relation to waveguide transitions is further elaborated.

At high frequencies, leakage at waveguide transitions need to be considered. Standardized waveguides are conventionally connected by arranging corresponding flanges face to face which are then screwed together such that a galvanic connection is obtained between the walls of the waveguide, WG, openings. However, when clamping together two WG pieces that are incompatible, e.g., very different in dimension and material, the mechanical tolerances in the manufacturing and assembly may cause unwanted airgaps between the two connecting subparts. This is especially the case when one of the subparts is fragile and excess mechanical force cannot be applied, preventing the two subparts from being clamped tightly together. A typical example is to interface a metal standardized WG, which is bulky and mechanically robust, and a silicon, Si, chip with embedded micromachined WG, which is tiny and fragile.

Another technique that can be utilized, if the flanges of the waveguides to be connected are compatible (e.g. size, geometry, material), is the Gap-wave technology. Here, the waveguide-to-waveguide transition can be made even if there is a small air gap between the flanges, see e.g. Zaman, A. U., & Kildal, P. S. (2014). Wide-band slot antenna arrays with single-layer corporate-feed network in ridge gap waveguide technology. *IEEE Transactions on antennas and propagation,* 62 (6), 2992-3001.

The waveguide-to-waveguide transitions mentioned above, both the conventional waveguide, WG, flange and the Gap-wave based, work fine when the two waveguides are compatible, that is of the same type or similar in size, geometry, and material. Otherwise, neither of them works very well. An example of non-compatibility is given in FIG. 1 where cross-sections of two distinctive waveguides are schematically illustrated. FIG. 1*a* shows a standardized D-band (110-170 GHz) metal WG flange 30, FIG. 1*b* shows a silicon microcircuit (i.e., a die or chip) 42 with embedded micromachined WG 43, see e.g. Beuerie, B., Campion, J., Shah, U., & Oberhammer, J. (2018). A Very Low Loss 220-325 GHz Silicon Micromachined Waveguide Technology. *IEEE Transactions on Terahertz Science and Technology*, 8 (2), 248-250. Both waveguides are for the same frequency band and the waveguide openings are of the same dimensions. However, the two WGs have no similarity in terms of flange size, geometry and material. More specifically, the dimension of the metal flange is about 20 mm in diameter which is very bulky compared to the silicon die which typically has a thickness of only a couple of millimeters. Further, the material of the chip is very fragile since it comprises brittle material which cannot be exposed to mechanical stress which also implies that screws cannot be utilized to connect the two WGs. Moreover, there is no place on the chip to make screw holes that matches the screw holes 29 on the standardized D-band metal WG flange. The WG port of the microcircuit is at the edge of a thin die which means that there is no surrounding ground as is the case of a traditional WG-flange. Due to limitations on the chip, it is difficult to arrange an extended ground plane symmetrically around the waveguide opening, it can only be attached to one side of the die). Also, there is not a perfect flat surface at the die edge.

That is, the interfaces of the chip-level waveguide and the standardized waveguide are non-compatible to each other. Given these conditions, the abovementioned conventional waveguide flange connection using screws, or the Gap-wave based connection requiring compatible sizes and matching flanges are not suitable. There are various ways used in laboratory environment for interconnecting a chip-level waveguide and a bulky metal waveguide, but they are all based on manual operation, thus, they are not suitable for volume production.

A typical scenario where waveguide structures on chip level need to be connected to mechanical robust metal waveguide structures is in products for millimeter-wave and THz-frequencies. These technologies enable more waveguide structures on chip-level integration using microelectromechanical system, MEMS, technology. Example of circuits using MEMS are diplexers, filters, and power combiners/splitters, implemented with Silicon, Si, waveguides on chip level. These circuits, where the entire die thickness often is less than half wavelength, need to be interfaced with standard waveguide flanges.

To interface two WGs that are not compatible in dimension and material, a non-galvanic solution is proposed for a die-to-metal waveguide transition where the two WG openings (ports) have no direct physical contact and a thin gap is allowed between them. This resolves not only the challenge with the WG mis-match, but also relaxes the tolerance requirement in manufacture and assembly and avoids stress on the die. However, the airgap introduces electromagnetic, EM, discontinuity at the transition. This may result in large transition losses, reflections, unwanted wave propagations (e.g., leakage) and even undesired resonances. The structure of the metalized waveguide interface in the proposed solution consists of a metal trench, radio frequency, RF, chokes and in some embodiments a metal hat introduced to suppress the leakages, reflections, and the resonances caused by the airgap. Hence, signal integrity issues are kept under control. The proposed solution further provides an enhanced non-destructive connection suitable for automatic assembly and industrial production. According to some aspects non or less soldering and/or glue is required in the assembly process.

Some of the embodiments contemplated herein will now be described more fully with reference to the accompanying figures. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Moreover, the figures comprise some features which are illustrated with solid lines and features which are illustrated with dashed lines. The features which are illustrated with solid lines are features comprised in the broadest example embodiment. The features which are illustrated with dashed lines are example embodiments which may be comprised in, or part of, or are further embodiments which may be taken in addition to the features of the broader example embodiments.

FIGS. 2-8 illustrate different aspects of a metalized waveguide interface 1 for providing a galvanically isolated waveguide connection for a propagating signal, between a standardized waveguide 2 and a, to the standardized waveguide non-compatible, metalized chip-level waveguide 3 according to an embodiment.

A waveguide interface is a waveguide adapter, i.e. a device to be positioned or arranged between non-compatible waveguides such that a waveguide transition is obtained.

According to aspects, by waveguide a hollow waveguide is referred to.

The metalized waveguide interface may for example be made of plastic having metalized outer surface. According to aspects, the metalized waveguide interface can be of solid metal. According to other aspects, the waveguide interface is not fully metalized, hence non-metalized outer surface parts are present.

A propagating signal is a propagating electromagnetic field. One frequency span of interest for millimeter-wave, mmW, products is the D-band, i.e. frequencies between 110 GHz-170 GHz, with a centre frequency of 140 GHz. According to aspects, the propagating signal has a frequency in the range of 30 GHz-300 GHz corresponding to mmW-applications, or in the range 110 GHz-170 GHz (D-band) or of approximately 140 GHz.

By "approximately" or "≈" means that the value is within a reasonable tolerance level known within the technical field.

A standardized waveguide may for example be a waveguide defined by any of the standards International Electrotechnical Commission, IEC, Electronic Industries Alliance, EIA, or Radio Components Standardization Committee, RCSC.

A chip-level waveguide is a Si-carrier comprising a waveguide, or in other words a microwave structure with a waveguide opening (port) integrated on a chip, i.e. a microcircuit. According to aspects, the chip-level waveguide is a bare die. Microcircuit microwave structures can be manufactured by e.g. micro-electromechanical system, MEMS, technology. According to aspects, the connecting die itself have metallization on its top and edges. The interface of a microwave structure on a chip is not compatible (size, geometry, or material properties) with a standard waveguide. Hence, conventional methods of connecting the WGs cannot be used.

The chip-level waveguide is not a microstrip transmission line since only one continuous conducting surface is present.

Galvanically isolated means that the waveguide transition itself is non-galvanic since a small gap is present between the waveguide openings of the chip-level waveguide and the waveguide interface, respectively. This is to be compared to when two standardized waveguides are connected to each other. In that case, the interfaces, which are symmetrical to each other, are screwed together and a galvanic transition is obtained.

Figure 2:
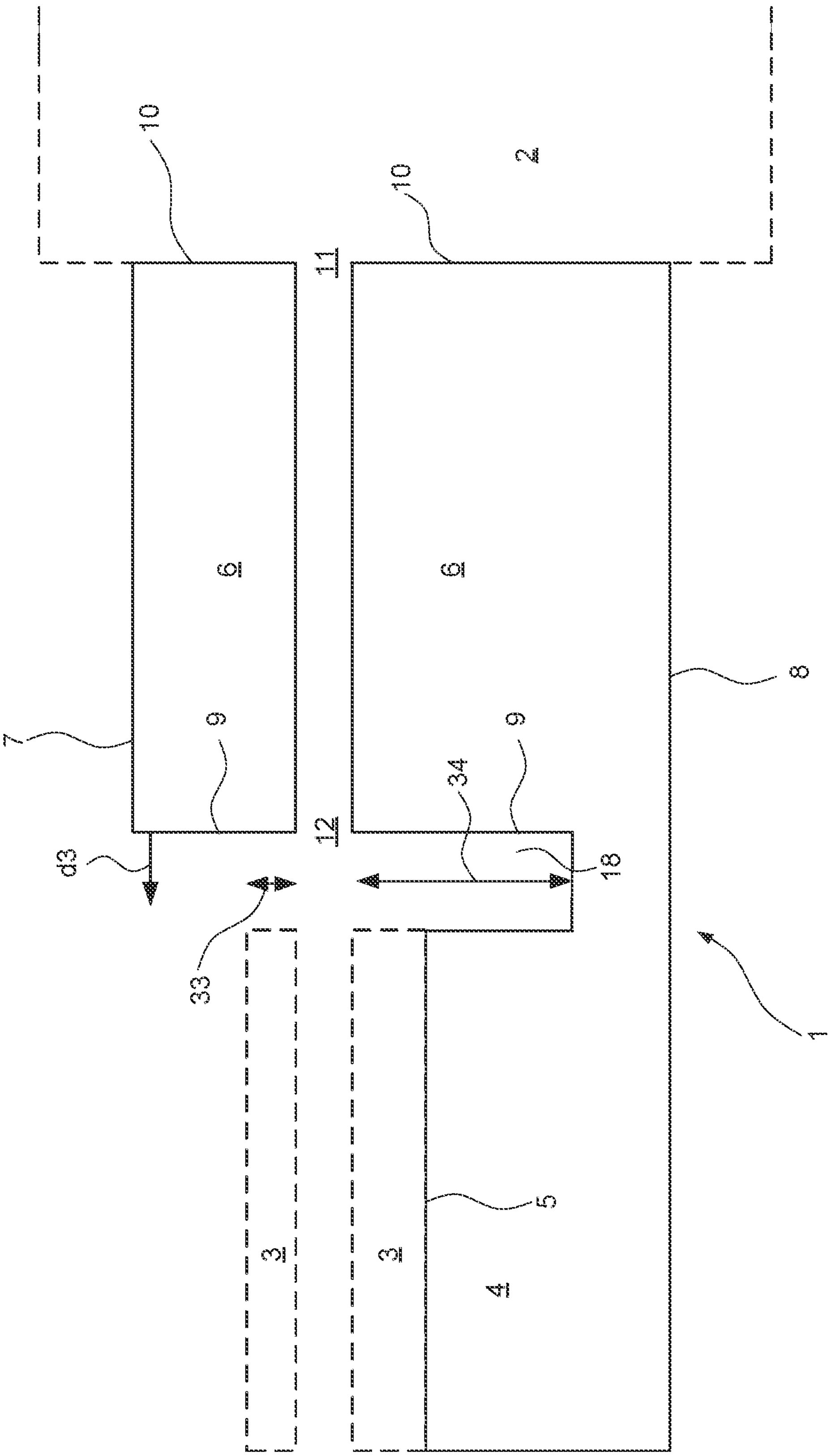
FIG. 2 illustrates a cross section of an exemplary metalized waveguide interface of the present disclosure.

Referring to FIG. 2, showing a cross section of the metalized waveguide interface 1. The metalized waveguide interface 1 comprises a support part 4 comprising a support surface 5 for mounting the metalized chip-level waveguide. The only galvanic connection between the metalized chip-level waveguide 3, when present, and the waveguide interface 1 is along the support surface 5. According to aspects, the support surface is the only surface portion of the waveguide interface that is in direct contact with the chip-level waveguide. According to further aspects, the chip-level waveguide is mounted to the waveguide interface by just positioning it on the support surface. It may for example, lie on shelf in the mechanics (support surface), exposed to horizontal pressure by e.g. a spring-screw from top. Thus, no glue or soldering is required. However, the waveguide may in addition or alternatively be mounted by using glue or soldering or a combination thereof.

The support surface provides for a flexible waveguide transition where waveguides having non-compatible connection surfaces, e.g. where there are no symmetrical connection surfaces, can be connected. It is especially suited for a fragile microcircuit which may break when exposed to mechanical stress.

The mounting on the support surface and the presence of a non-galvanic gap between the waveguides make the proposed solution scalable and suitable for high-volume automatic assembly. Further, according to some aspects, the connection is non-destructive with no or less need for glue and/or solder compared to standard solutions.

The metalized waveguide interface 1 further comprises a transition part 6 comprising a first surface portion 7, a second surface portion 8, a third surface portion 9 and a fourth surface portion 10. With reference to the orientation of the waveguide in FIG. 2, the first surface portion is the top surface, the second surface portion is the bottom surface, and the third surface is the front surface facing the chip-level waveguide. Further, the back surface, i.e. the fourth surface portion 10, comprises a first rectangular waveguide opening 11 compatible connectable to a waveguide opening of the standardized waveguide 2.

The utilization of the terms left, right, top, upper, lower, bottom etc should not be seen as limiting. These are used as a complement to the more generic terms and used in reference to the orientation of the waveguide interface in the Figures to increase readability.

A waveguide opening may also be referred to as a port or waveguide port.

By compatible connectable it means that the dimensions of the first rectangular waveguide opening 11 matches the dimensions (length and height) of the waveguide opening of the standardized waveguide. Further, the back surface 10 comprises a flange which matches in size, geometry, and material properties with the flange of the standardized waveguide. According to aspects, the standardized waveguide and the waveguide interface is manufactured as one unit.

Figure 3:
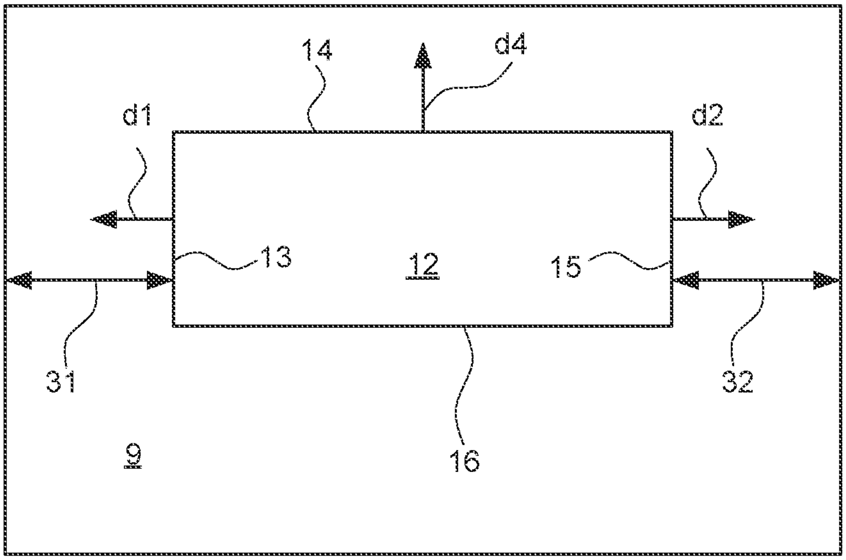
FIG. 3 illustrates further aspects of the metalized waveguide interface.

The front side, i.e. the third surface portion 9 illustrated in FIG. 3, comprises a second rectangular waveguide opening 12 having dimensions comprising a first side 13, a second side 14, a third side 15 and a fourth side 16. With reference to the orientation of the waveguide interface in FIG. 3, the first side is the left side, the second side is the upper side, the third side is the right side and the fourth side is the lower side. In other words, the first side 13 and the third side 15 are parallel to each other. The second side 14 and the fourth side 16 are parallel to each other and to the first surface portion (top surface) 7 and the second surface portion (bottom surface) 8. The fourth side 16 is arranged closest to the second surface portion (bottom surface), 8. According to aspects, the second and the fourth sides are longer than the first and the third side, respectively.

According to aspects, the first side 13 and the third side 15 are shorter than the second side 14 and the fourth side 16.

According to aspects, the first side 13 and the third side 15 each have a length corresponding to a phase shift of the propagating signal of approximately $\pi/2+n\pi$ (n is an integer greater or equal to zero).

According to further aspects, the second side 14 and the fourth side 16 each have a length corresponding to a phase shift of the propagating signal of approximately $\pi+n\pi$ (n is an integer greater or equal to zero).

By the expression "corresponding to a phase shift of the propagating signal of approximately {angle}" it is throughout the text understood that the angle does not have to be absolutely equal to the value, just approximately equal in order to achieve the aimed functionality. Hence, the value is within the error margin, known within the field, acceptable to achieve the aimed effect.

For example, when the second and the fourth sides correspond to a phase shift of approximately $\pi$ it means that the phase shift is such that the $TE_{10}$-mode is the dominating propagating mode in the waveguide.

"A length corresponding to a phase shift $\Delta\Theta$ of the propagating signal" refers to the physical length the signal needs to propagate to change its phase by $\Delta\Theta$ radians.

A phase shift of $2\pi$ corresponds to a physical length equal to the wavelength, $\lambda_g$, of the guided wave in a straight rectangular waveguide. That is, $\lambda_g$, is defined as the distance between two equal phase neighbouring planes along the waveguide. In bent or curved waveguides, the relation becomes more complicated since changes of the electromagnetic field caused by the corners need to be considered.

For example, working in the D-band with a dominating $TE_{10}$-mode, the standardized rectangular waveguide has dimensions $\lambda_g/2\approx1.6$ mm and $\lambda_g/4\approx0.8$ mm.

The phase shift may also be denoted electrical length or effective electrical length ($L_\theta$). Due to the repeating pattern of an electromagnetic field (signal), the electromagnetic properties repeat itself by a factor of $2\pi$ or parts thereof. For example, the electrical length of $\pi/2$ may give rise to the same electromagnetic properties as an electrical length of $3\pi/4$.

The dimensions of the second waveguide opening match dimensions of a waveguide opening of the metalized chip-level waveguide 3. That is, the openings are of the same size (length and height).

The proposed solution allows an airgap between the two subparts, i.e., the waveguide openings of the waveguide interface and the chip-level waveguide, respectively. Thereby, the two subparts are aligned and facing each other but with a narrow gap in between. According to aspects, the gap is much less than a wavelength. Such transition is called non-galvanic transition.

According to further aspects, the gap 44 between the waveguide openings is less or equal to 200 micrometer or less or equal to 100 micrometer or less or equal to 40 micrometer or less or equal to 20 micrometer or less or equal to 10 micrometer.

By having an airgap between the two WGs, potential mechanical stress across the microcircuit is avoided.

Further, due to the airgap between the two WGs, mismatch in coefficient of thermal expansion between the two subparts is less critical as compared with interconnection using direct physical contact.

To avoid unwanted leakage, radiation and wave propagation that cause losses, e.g. surface currents due to the discontinuity in the interface, i.e., the gap, the geometry of the waveguide interface is carefully chosen. The geometry is chosen such that when the chip-level waveguide is arranged with a gap, RF-chokes are obtained such that the gap does not affect the propagating field. More specifically, the widths, heights, and depths of material around the gap have lengths corresponding to resonant electrical lengths that transforms to radio frequency, RF, shorts around the waveguide opening. This makes the non-galvanic transition to behave like a galvanic transition.

The RF chokes' positions, geometry, and influence of the electromagnetic field is further explained in the following paragraphs, and with reference to FIGS. 4-8.

The RF shorts are all obtained when the chip-level waveguide is arranged on the support surface. Explained differently, the proposed solution is to construct the waveguide interface such that the walls of an imaginary extension of the waveguides formed in the gap appear to have a very low impedance. That is, the waveguide appears to be continuous to the propagating signal which propagates as if the imaginary extension in the gap had walls of metal. Thus, a low-loss transition is obtained that suppresses leakages when an airgap exists.

Figure 4A:
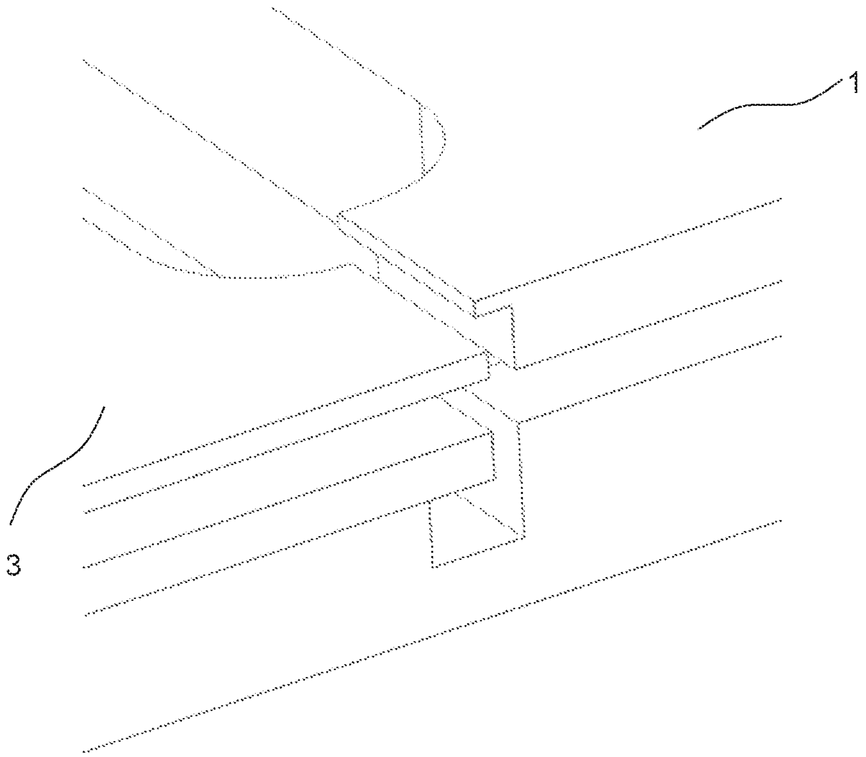
FIG. 4A and FIG. 4B illustrate further aspects of the metalized waveguide interface.
Figure 4B:
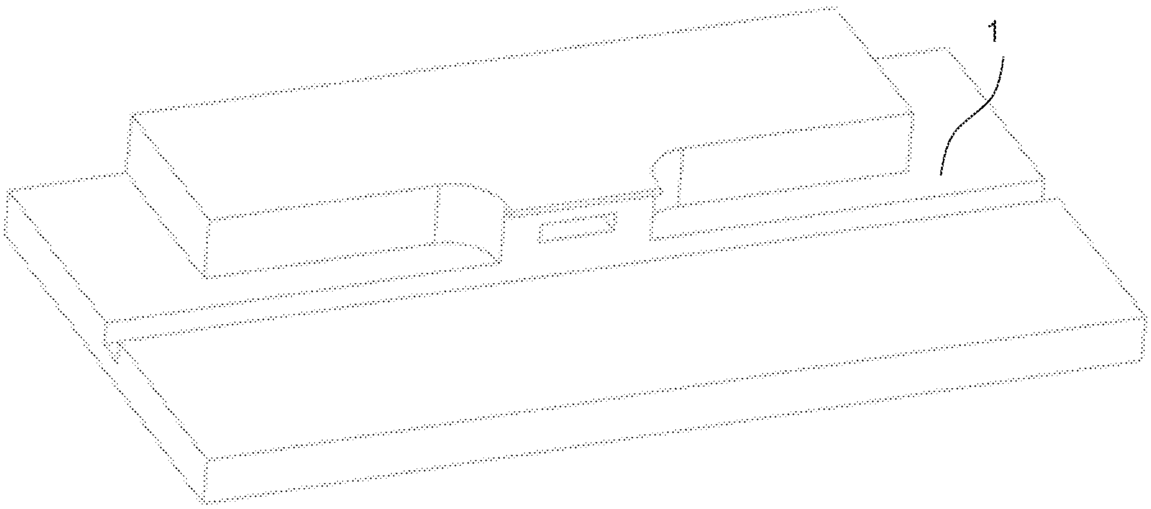

FIG. 4*a* shows a cross section of the transition from a die 3 to a metalized waveguide structure 1, i.e. the waveguide interface. FIG. 4*b* illustrates how this transition may be implemented by a pipe in the metalized block forming a wall of a quarter wavelength RF-choke around the opening on each side of the waveguide, to the free open space.

Figure 5:
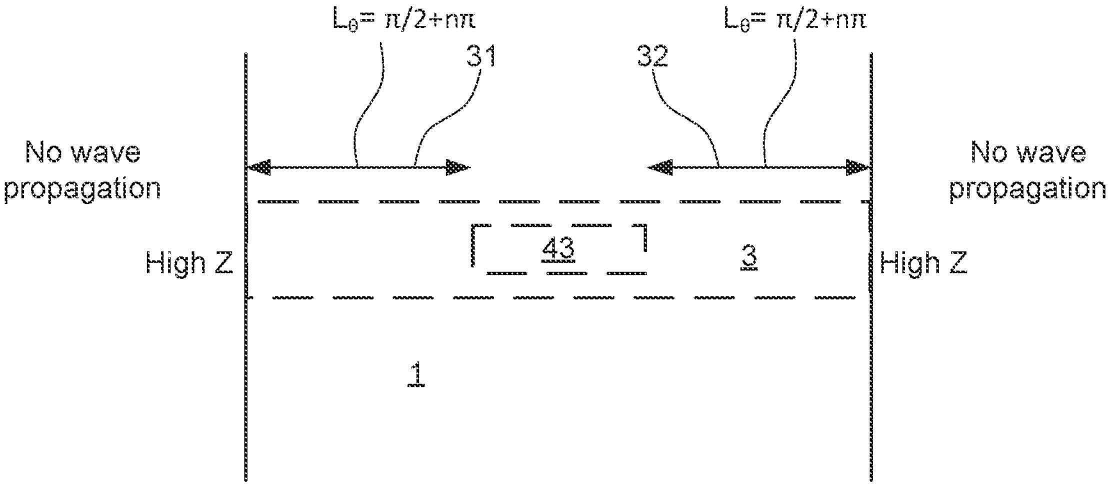
FIG. 5 shows another cross section of the exemplary metalized waveguide interface of the present disclosure.

In other words, as illustrated in FIGS. 3 and 5, a first RF choke is obtained by having the third surface portion 9 extending in a first direction d1 from the first side 13 and parallel to the fourth side 16, such that a first open-ended quarter wavelength waveguide 31 is obtained along the direction d1 when the metalized chip-level waveguide 3 is mounted on the support surface 5.

According to aspects, the first open-ended quarter wavelength waveguide 31 is a radio frequency, RF, choke.

A second RF choke is obtained by having the third surface portion 9 extending in a second direction d2 from the third side 15 and parallel to the fourth side 16, such that a second open-ended quarter wavelength waveguide 32 is obtained along the direction d2 when the metalized chip-level waveguide 3 is mounted on the support surface 5.

According to aspects, the second open-ended quarter wavelength waveguide 32 is a radio frequency, RF, choke.

Thus, open-ended quarter wavelength parallel plate waveguides are obtained between the metalized front surface, i.e. the third surface portion 9, of the waveguide interface 1, and a metalized front surface, i.e. a second surface portion 42, of the chip-level waveguide.

According to aspects, the effective electrical length, $L_\theta$, of at least one of the first open-ended quarter wavelength waveguide 31 or the second open-ended quarter wavelength waveguide 32 corresponds to a phase shift of the propagating signal of approximately $\pi/2+n\pi$ (n is an integer greater or equal to zero).

An open-ended waveguide having a length corresponding to a phase shift of $\pi/2+n\pi$, acts as a short-circuit at the other opening. Hence, the propagating signal experiences a low impedance at the entrance (in the gap) of the open-ended waveguide.

Expressed differently, two RF-opens are formed at the left and right side of the transition as the impedance at the RF-opens is assumed to have high free space impedance. A quarter-wavelength then transfers to RF-short.

A phase shift of $\pi/2+n\pi$ corresponds to a physical length of $\lambda_g/4+n\ \lambda_g/2$. Where $\lambda_g$ is the wavelength of the propagating signal in the gap-region.

An open-ended waveguide is an open waveguide.

According to aspects, the first open-ended waveguide has a length corresponding to a phase shift of $\pi/2$ of the propagating field.

According to aspects, the second open-ended waveguide has a length corresponding to a phase shift of $\pi/2$ of the propagating field.

Hence, it is provided two chokes that suppress resonances due to RF leakage in the gap from side edges of the waveguide openings.

According to aspects, when working in the D-band the largest leakage is due to the dominating $TE_{10}$-mode. This leakage is effectively reduced by the first and second open-ended quarter wavelength waveguides.

A third open-ended quarter wavelength waveguide 33 is provided by letting the third surface portion 9 extend in a fourth direction d4 from the second side 14 and parallel to the first side 13. In this way a third open-ended quarter wavelength waveguide 33 is obtained between the third surface portion 9 and the metalized chip-level waveguide 3 when the metalized chip-level waveguide 3 is mounted on the support surface 5, see FIG. 2.

Hence, according to aspects the third open-ended waveguide 33 is a straight waveguide.

According to further aspects, the third open-ended waveguide 33 is a radio frequency, RF, choke. Thus, a third RF choke is obtained.

In other words, an open-ended parallel plate waveguide is obtained between the metalized front surface, i.e. the third surface portion 9 of the waveguide interface and the metalized front surface of the chip-level waveguide 3.

According to aspects, the effective electrical length, $L_\theta$, of the third open-ended waveguide 33 corresponds to a phase shift of the propagating signal of approximately $\pi/2+n\pi$ (n is an integer greater or equal to zero).

As previously described an open-ended waveguide having a length corresponding to a phase shift of $\pi/2+n\pi$, acts as a short-circuit at the other opening. Hence, the propagating signal experiences a low impedance at the entrance (in the gap) of the open-ended waveguide. Further, the phase shift of $\pi/2+n\pi$ corresponds to a physical length of $\lambda_g/4+n\lambda_g/2$. Where $\lambda_g$ is the wavelength of the propagating signal in the gap-region.

According to aspects, the third open-ended waveguide has a length corresponding to a phase shift of $\pi/2$ of the propagating field.

Figure 6:
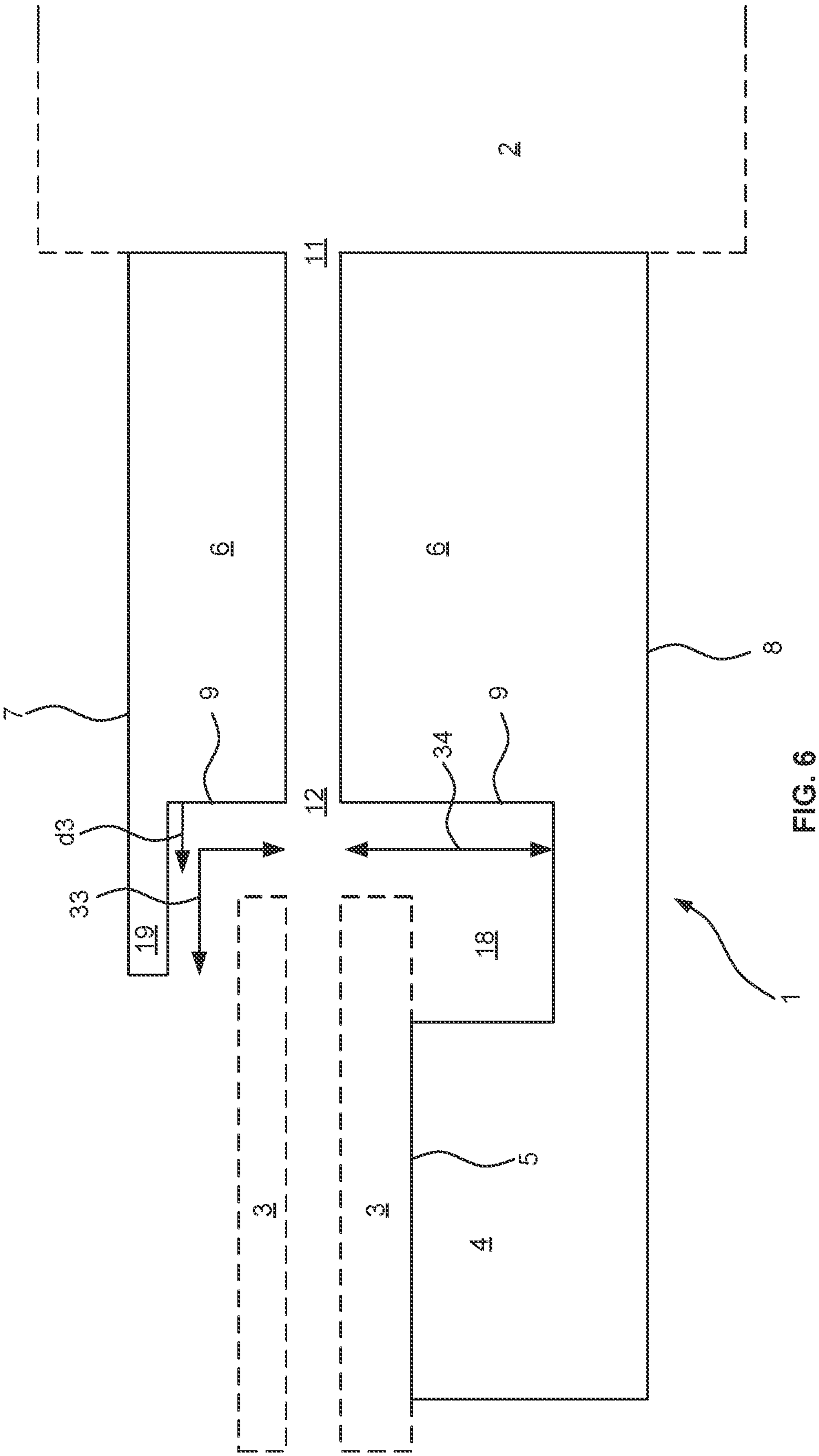
FIGS. 6-7 show further exemplary cross-sections of the metalized waveguide interface of the present disclosure.
Figure 7:
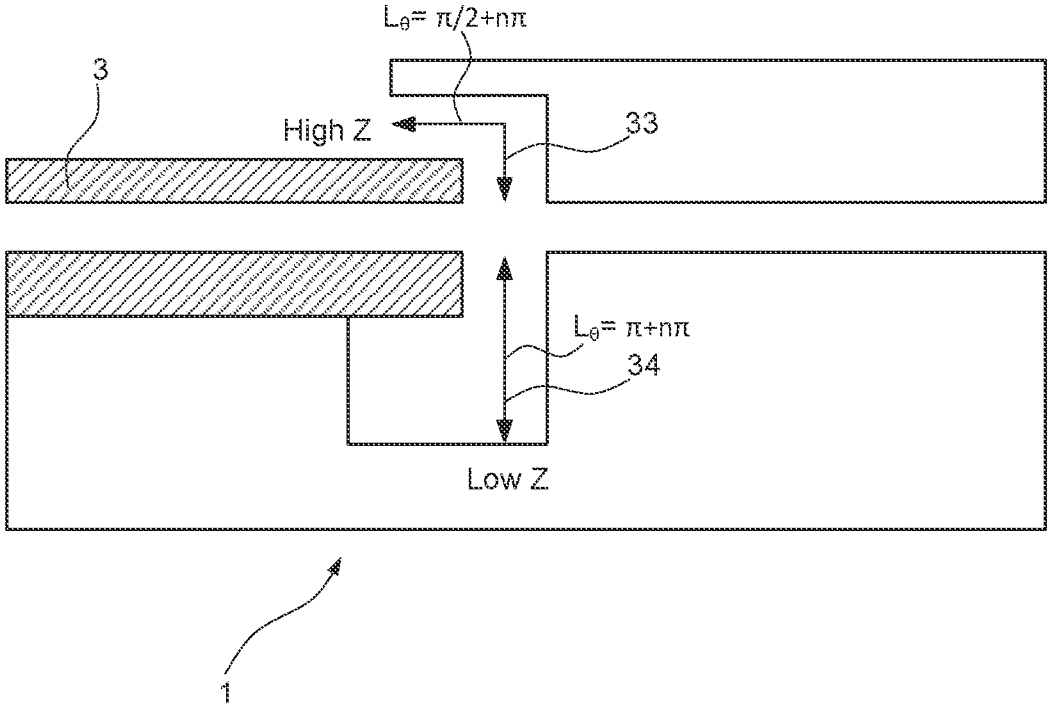

FIGS. 6 and 7 show a further aspect where the third open-ended waveguide 33 comprises a bend. The waveguide may for example be L-shaped.

Hence, according to aspects, the transition from a die 3 to a metal waveguide structure, i.e. the waveguide interface 1, is further implemented by a "choke hat".

According to aspects, the choke hat covers a quarter wavelength from the top of the waveguide opening, extending above the die. According to aspects, the die is assumed to have smaller thickness above its waveguide opening than a quarter wavelength, due to the limited Si wafer thickness. Thus, the choke hat sticks out above the die 3.

Expressed differently, the metalized waveguide interface comprises an extended portion 19, i.e. the choke hat, comprising an extension of the first surface portion 7 and the transition part 6, the extended portion 19 extending at least between the first side 13 and the third side 15 and in the direction d3. The geometry of the extended portion 19 is such that the third open-ended quarter wavelength waveguide 33 is obtained when the metalized chip-level waveguide 3 is mounted on the support surface 5.

In other words, an open-ended parallel plate waveguide is obtained between the metalized front surface, i.e. the third surface portion 9 of the waveguide interface, the metalized bottom surface of the extended portion 19 and part of the metalized top surface of the chip-level waveguide 3.

The physical length of the third RF choke corresponding to $\pi/2+n\pi$ may vary depending on the geometry of the open-ended waveguide since bends and corners introduce capacitive and reactive contributions that need to be considered. However, in all examples the physical length of the choke hat is constructed such that the electromagnetic field, in the waveguide, experience a net phase shift of $\pi/2+n\pi$, different non-limiting examples are shown in FIGS. 8*a-d.*

The physical length may in one example be the shortest distance along the front surface, i.e. the third surface portion 9, of the metal interface, between the upper side, i.e. the second side 14, of the second waveguide opening, and the end of the extended portion 19, as shown in FIG. 8*a*. This shows an example where the distance above the WG opening of the waveguide interface is short, and the choke hat extends to become a quarter-wavelength that transforms the high open space impedance to an RF-short. FIGS. 8*b* and 8*c* show the third open-ended quarter wavelength waveguide 33 as a straight waveguide as discussed above. Further, if the distance between the chip-level waveguide and the choke hat is too large, as illustrated in FIG. 8*d*, the third waveguide may become a straight waveguide even if a choke hat is present.

Hence, it is provided for a third RF-choke that suppresses resonances due to RF leakage in the gap from top edges of the waveguide openings.

The transition from the die 3, i.e. the chip-level waveguide, to a metal waveguide structure 1 is further implemented by a choke trench 18 positioned in front of and below the die forming a half wavelength short-circuited ground plane.

As further illustrated in FIG. 2, the metalized waveguide interface comprises a trench comprising a recess 18 in the metalized waveguide interface 1 extending at least between the first side 13 and the third side 15. The recess 18 further extends in a direction d3, perpendicular to the second rectangular waveguide opening 12, towards the support part 4. The recess 18 separates the transition part 6 and the support part 4, such that a short-circuit half wavelength waveguide 34 is obtained when the metalized chip-level waveguide 3 is mounted on the support surface 5.

A trench may be a choke trench, ditch, or groove.

According to aspects, the short-circuit half wavelength waveguide 34 is a radio frequency, RF, choke. Thus, a fourth RF choke is obtained.

That is, a closed-end parallel plate waveguide is obtained between the metalized front surface, i.e. the third surface portion 9 of the waveguide interface, the walls of the trench 18 and part of the metalized bottom surface, i.e. a first surface portion 41 of the chip-level waveguide.

According to aspects, the effective electrical length, $L_\theta$, of the short-circuit half wavelength waveguide 34, the fourth RF choke, corresponds to a phase shift of the propagating signal of approximately $\pi+n\pi$ (n is an integer greater or equal to zero).

A short-circuit, i.e. grounded, waveguide having a length corresponding to a phase shift of $\pi$, or an integer multiple thereof, acts as a short-circuit at the other opening. Hence, the propagating signal experiences a low impedance at entrance (in the gap) of the open-ended waveguide.

Further, the phase shift of $\pi+n\pi$ corresponds to a physical length of $\lambda_g/2+n\lambda_g/2$. Where $\lambda_g$ is the wavelength of the propagating signal in the gap-region.

According to aspects, the short-circuit waveguide has a length corresponding to a phase shift of $\pi$ of the propagating field.

According to aspects, the short-circuit half wavelength waveguide 34 may comprise a bend, as illustrated in FIGS. 6 and 7. The waveguide may for example be L-shaped after the chip-level waveguide is mounted. The physical length corresponding to $\pi+n\pi$ may vary depending on the geometry of the short-circuit waveguide since bends and corners introduce capacitive and reactive contributions that need to be considered. Non-limiting examples are given in FIGS. 8*e*-8*h*. The physical length may be the depth of the trench as shown in FIG. 8*e* where straight short-circuit waveguide with two different distances between the plates is present. In other examples, FIGS. 8*f* and 8*h*, the physical length is the depth of the trench and the distance between the waveguide plates is constant. In the examples in FIGS. 8*f* and 8*h* the thickness of the die 3 varies. The physical length may in another example, FIG. 8*g*, be the depth of the trench plus the width of the trench (an L-shaped waveguide). However, in all examples the physical length is such that the electromagnetic field in the waveguide experience a net phase shift of $\pi+n\pi$.

Figure 8:
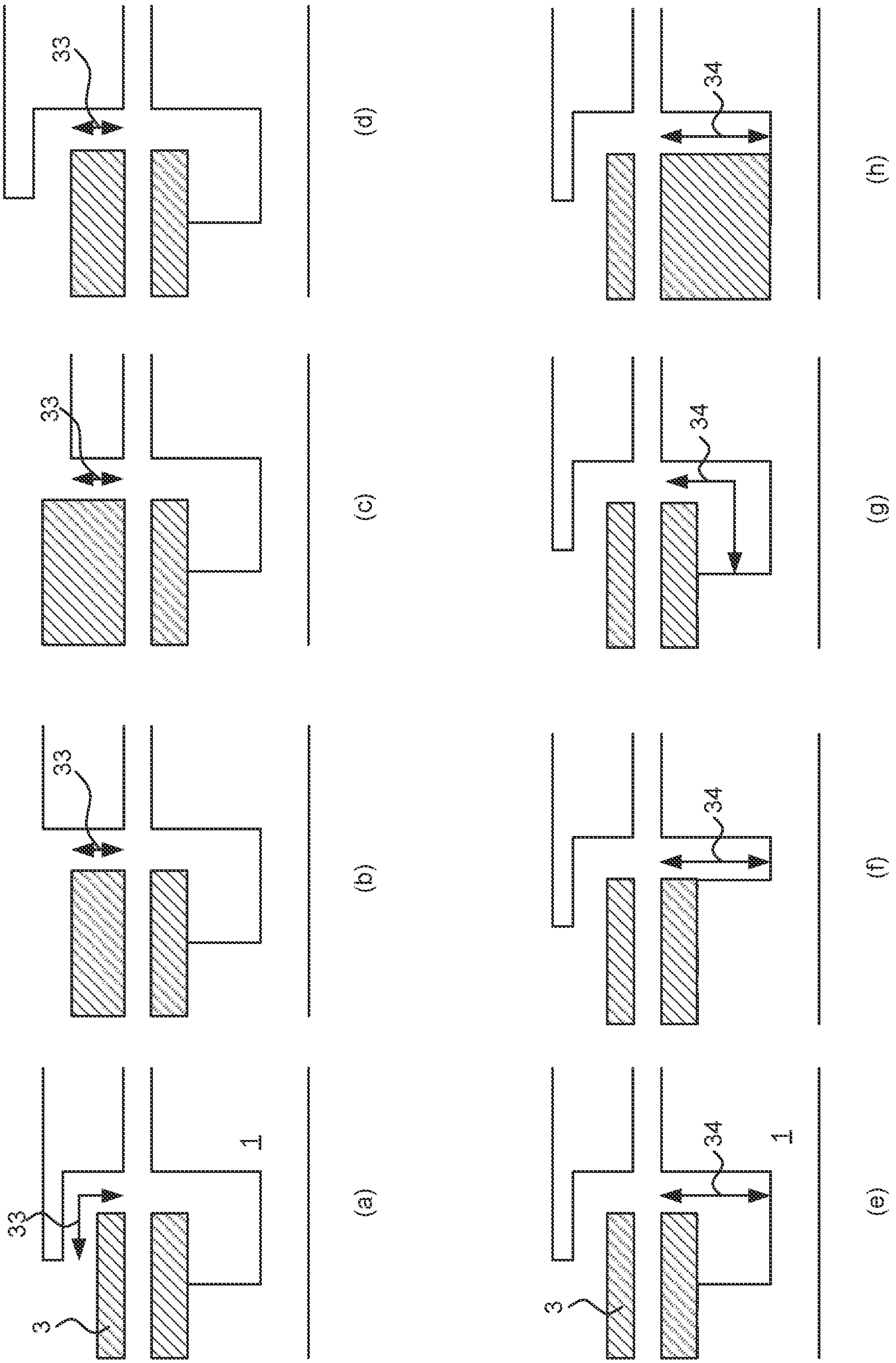
FIG. 8 shows different examples of the third open-ended quarter wavelength waveguide and the short-circuit half wavelength waveguide, respectively.

It is understood that the choke hats and trenches in the different examples of FIG. 8 can be freely combined.

Figure 9:
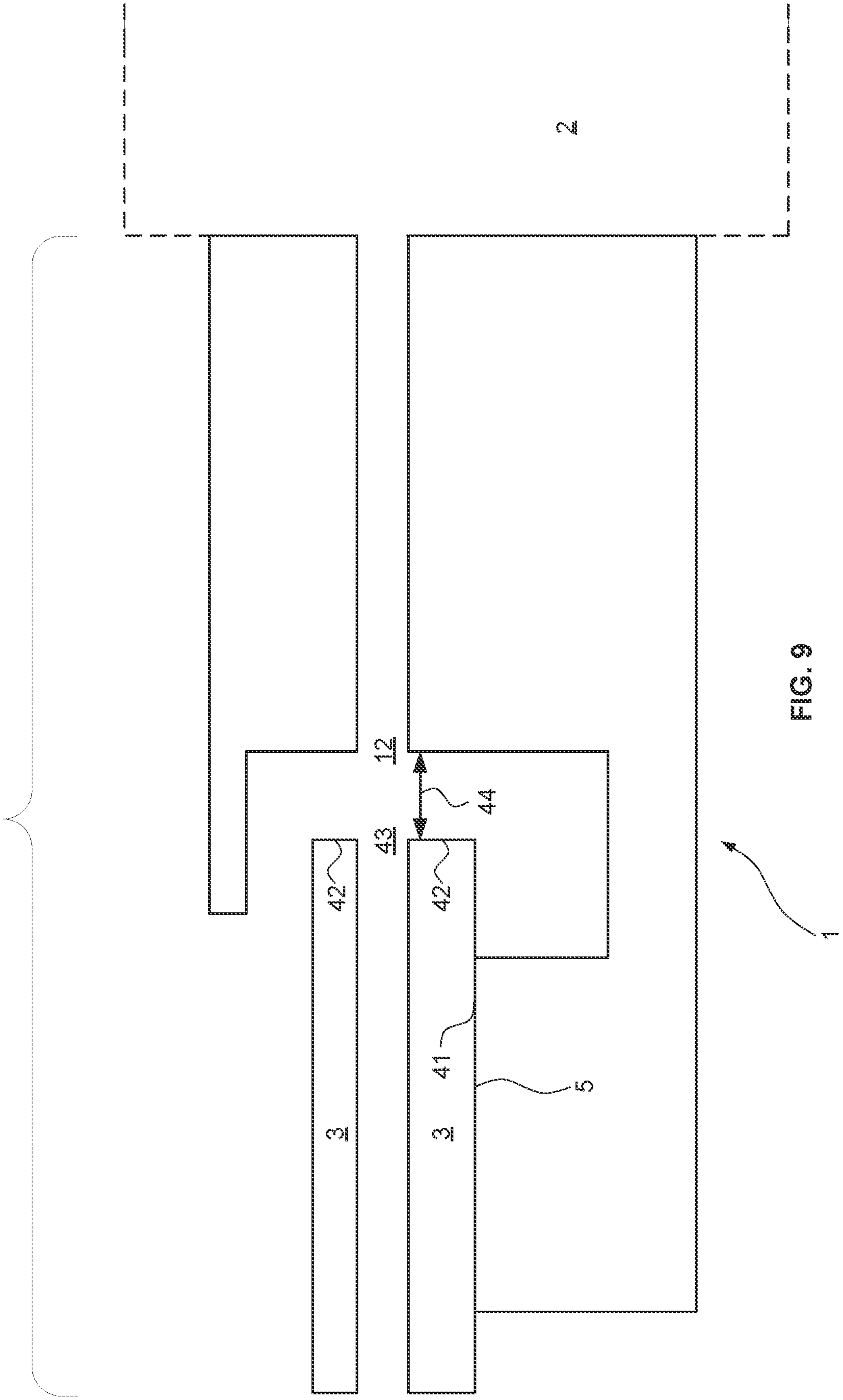
FIG. 9 illustrates a cross section of an exemplary waveguide transition of the present disclosure.
Figure 10A:
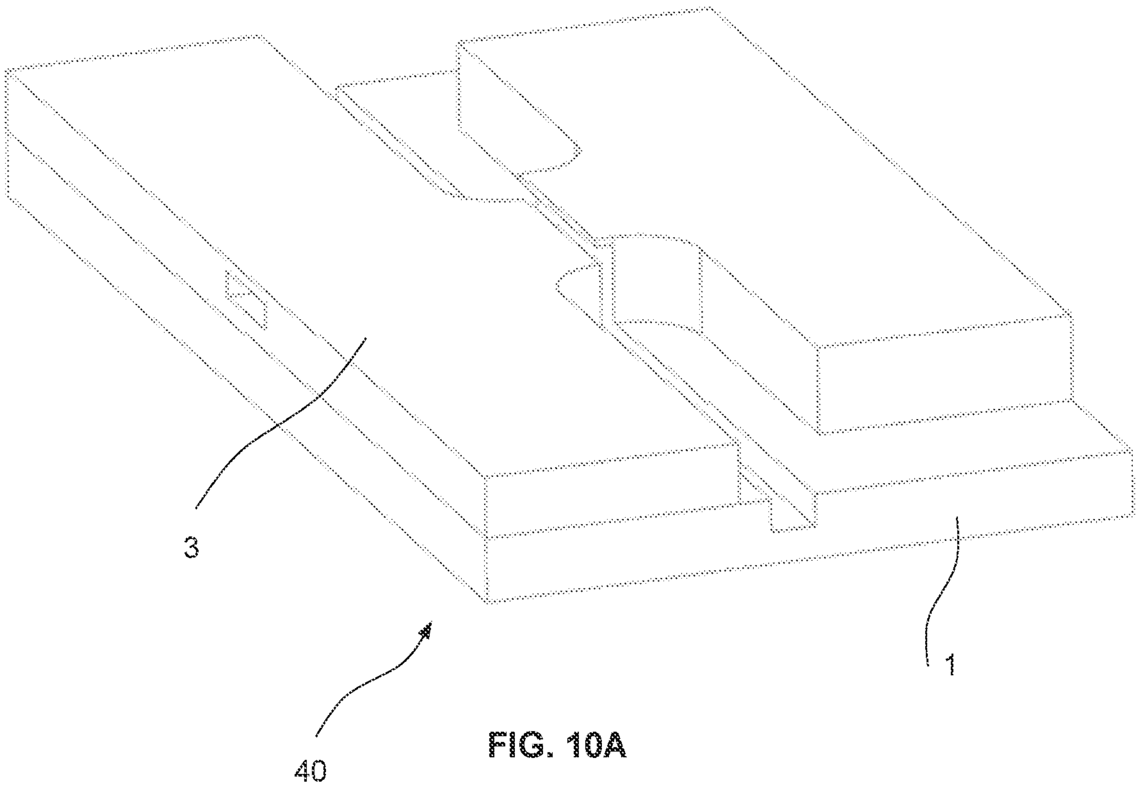
FIG. 10A, FIG. 10B, and FIG. 11 show further aspects of the exemplary waveguide transition to the metalized chip-level waveguide.
Figure 10B:
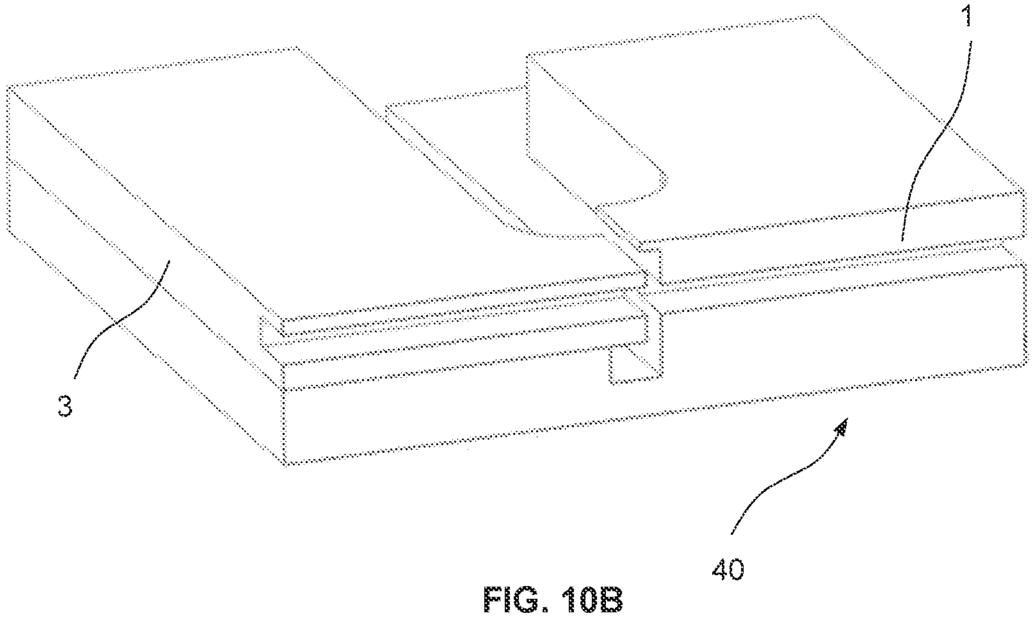
Figure 11:
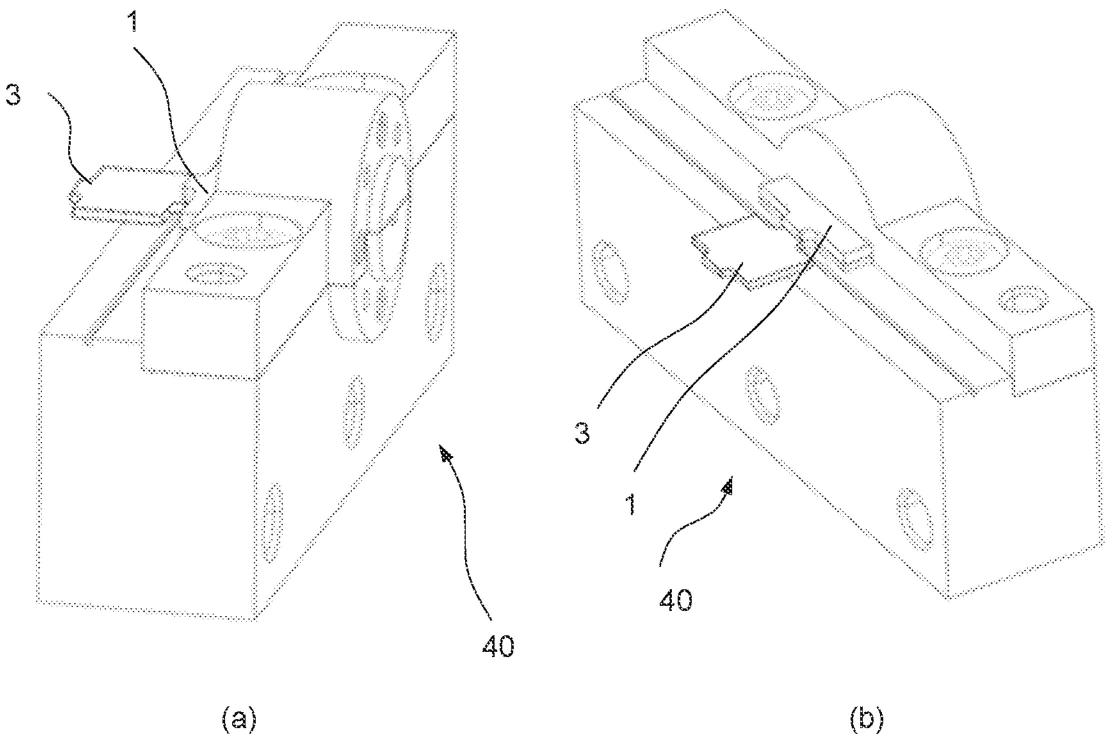

According to further aspects, if the opening in the chip-level waveguide is very close to the bottom surface of the chip-level waveguide (i.e. if the first part of the chip-level waveguide 42 in FIG. 9 is almost zero) and it may be considered an almost perfect ground plane, then the trench can be omitted. However, in most cases the die has a finite thickness beneath its WG opening, and therefore a $\lambda_g/2$ distance through the trench to the waveguide is a good way to perform an RF-short boundary.

Hence, it is provided for a fourth RF choke that suppress resonances due to RF leakage in the gap from bottom edges of the waveguide openings.

It is proposed a solution where, no metal surfaces of the interface (besides the support surface 5) are assumed to have mechanical connection to the die and an airgap is accepted. Such solution avoids mechanical stress to be applied to the chip-level waveguide.

To prevent signal leakage in the gap, four RF-chokes surrounding the gap are obtained by open and closed waveguides. These four RF-chokes have the consequence that RF-short boundaries are obtained in the gap, i.e. the propagating electromagnetic field propagates as if the waveguide is not interrupted with an airgap. Hence, the signal behaves as if the waveguide continues with the same dimensions in the gap where (imaginary) walls in the gap ideally has impedance Z=0, i.e. grounded walls.

Given the advantages described above, the proposed solution offers an implementation that enhances a non-destructive connection. The solution is further suitable for automatic assembly.

The proposed solution is also scalable. Hence, the waveguide interface is applicable in high-volume production of mmW- and THz-systems and products.

According to aspects, the waveguide opening of the chip-level waveguide is not of standard dimensions. For example, in the D-band, 110 GHz-170 GHz, the height of the standardized waveguide opening is 800 μm whereas a standard height of a chip is often 600 μm, which implies that the height of the opening in the chip can be maximum about 400 μm, i.e. less than $\lambda_g/2$.

Such situation can be dealt with by introducing an impedance transformer in the waveguide interface. One aspect of tapering is illustrated in FIG. 13. Thus, according to aspects, the metalized waveguide interface further comprises a tapered waveguide between the first waveguide opening 11 and the second waveguide opening 12.

FIG. 9, FIG. 10A, FIG. 10B, and FIG. 11 illustrate a waveguide transition 40 comprising a metalized waveguide interface 1 as described above. It may further comprise a metalized chip-level waveguide 3 arranged on the support surface such that the advantages and benefits as described above are obtained.

A cross section of the waveguide transition 40 is illustrated in FIG. 9. The metalized chip-level waveguide comprises a first surface portion 41 and a second surface portion 42, the second surface portion 42 comprising a third rectangular waveguide opening 43 with dimensions matching the dimensions of the second waveguide opening 12 of the metalized waveguide interface 1.

In other words, the length and height of the second waveguide opening are approximately equal to the length and height of the third waveguide opening.

Further, the second 12 and the third 43 waveguide openings are aligned and facing each other, such that a waveguide transition with a small gap is formed between them.

The metalized chip-level waveguide 3 is mounted such that the support surface 5 and the first surface portion of the metalized chip-level waveguide 41 are galvanically connected. According to aspects, the chip-level waveguide is mounted on the support surface.

The waveguide transition is flexible and suits chips of different sizes (MEMS-sizes).

Thus, the die is in electrical contact with the waveguide interface on the support surface only. This differs from a conventional waveguide connection where a galvanic waveguide connection is obtained at the waveguide openings when the flanges are screwed together.

In the proposed solution a gap 44 separates the second surface portion of the metalized chip-level waveguide 42 and the third surface portion of the metalized waveguide interface 9 such that a galvanically isolated waveguide connection is obtained.

Expressed differently, the waveguide openings of the chip-level waveguide and the waveguide interface have no direct physical contact, i.e. a non-galvanic connection is obtained.

According to aspects, the gap is much less than the wavelength of the propagating signal in the waveguides. According to further aspects, the gap is less or equal to 200 micrometer, less or equal to 100 micrometer, less or equal to 40 micrometer, less or equal to 20 micrometer, or less or equal to 10 micrometer.

According to aspects the gap is filled with air. According to other aspects another material/s may fill the waveguides and the gap.

According to aspects, mechanical stress is avoided in the chip structure since no metal faces (besides the bottom side of the chip-level waveguide and the support surface) are assumed to have mechanical connection. Moreover, by mounting the chip-level waveguide on the waveguide interface as described above, RF-shorts are obtained in the gap which suppress leakage, reflection, and resonances.

A further advantage of the air gap is that a mis-match in coefficient of thermal expansion between the two subparts (waveguides to be connected) is less critical as compared with interconnect using direct physical contact.

The proposed solution may apply to any microcircuits with an embedded waveguide (i.e. a chip-level waveguide). For example, a waveguide made in SIW (substrate integrated waveguide).

According to further aspects the metalized chip-level waveguide is micromachined.

Figure 12A:
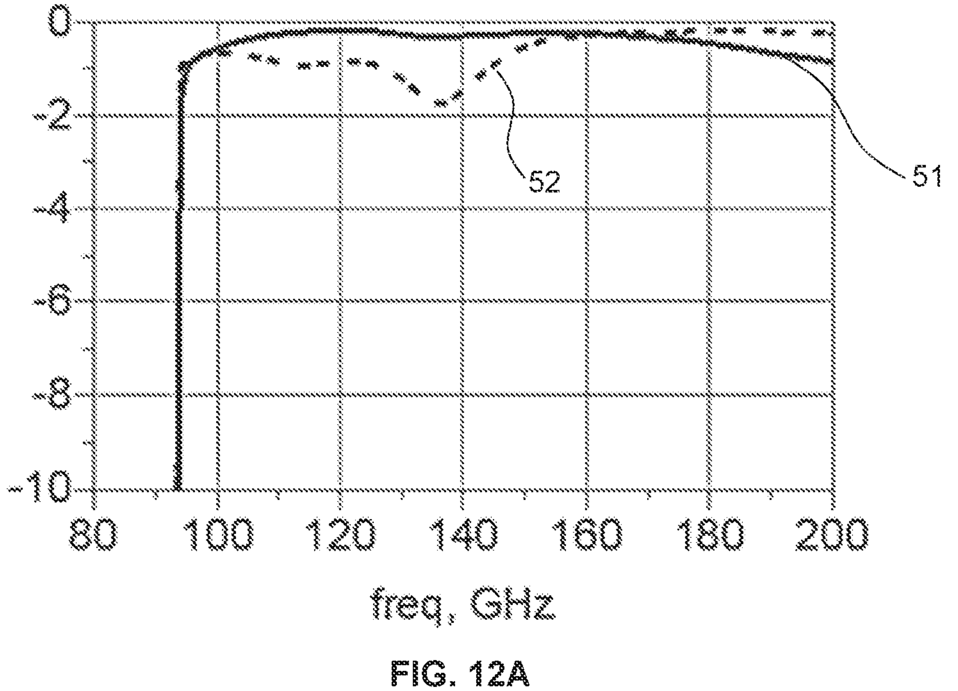
FIG. 12A shows the transmission and FIG. 12B shows the reflection in a waveguide transition of the present invention in comparison with a prior art solution.
Figure 12B:
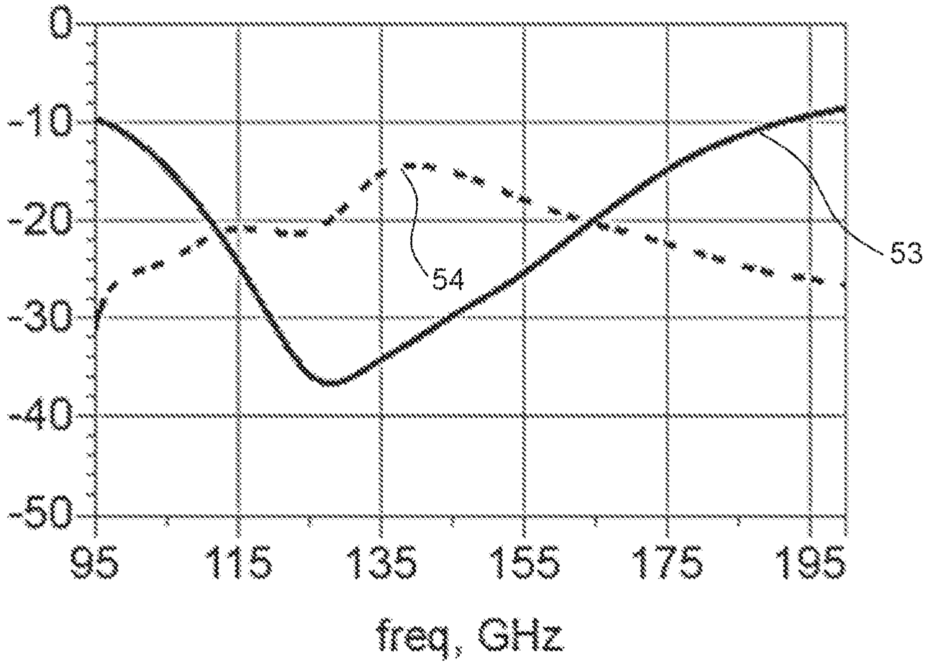

FIGS. 12*a* and 12*b* illustrate the effects of the waveguide interface and the waveguide transition described above. A full-EM simulation is carried out for the waveguide, WG, transition with and without the four RF-chokes. The frequency range is the D-band, the standardized rectangular waveguide has dimensions $\lambda_g/2\approx1.6$ mm and $\lambda_g/4\approx0.8$ mm with a dominating propagating $TE_{10}$-mode. The gap is 20 μm.

FIG. 12*a* shows the simulated transmission coefficient, S21, for the transmission with RF-chokes 51 (solid) and without RF-chokes 52 (dotted). FIG. 12*b* shows the simulated reflection coefficient S11, for the reflection with RF-chokes 53 (solid) and without RF-chokes 54 (dotted).

Further electromagnetic simulations show that the electrical field with the RF-chokes present is concentrated around the WG openings and negligible wave is propagated outwards. However, without the RF-chokes a wave can be excited in the gap between the die and the metal parts perpendicular to the WG opening, causing severe radiation losses.

Moreover, for an airgap up to 100 μm, the proposed transition arrangement features low loss (<1 dB) and negligible unwanted propagation modes and resonance at mmW-frequencies beyond 100 GHz.

Figure 13A:
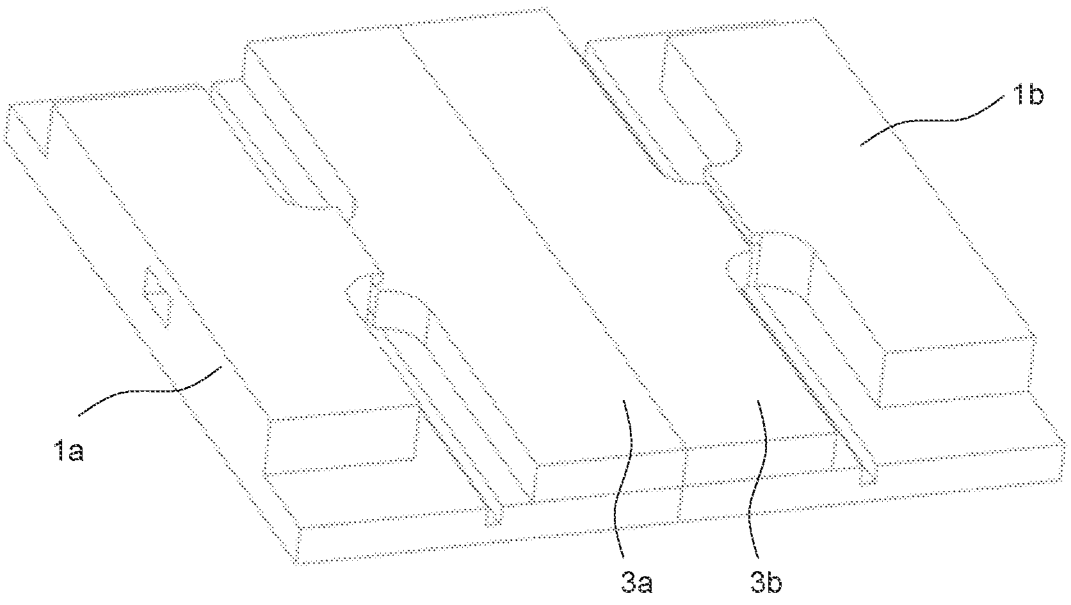
FIG. 13A and FIG. 13B show yet further aspects of an exemplary waveguide transition of the present invention connected in back-to-back configuration including impedance transformation.
Figure 13B:
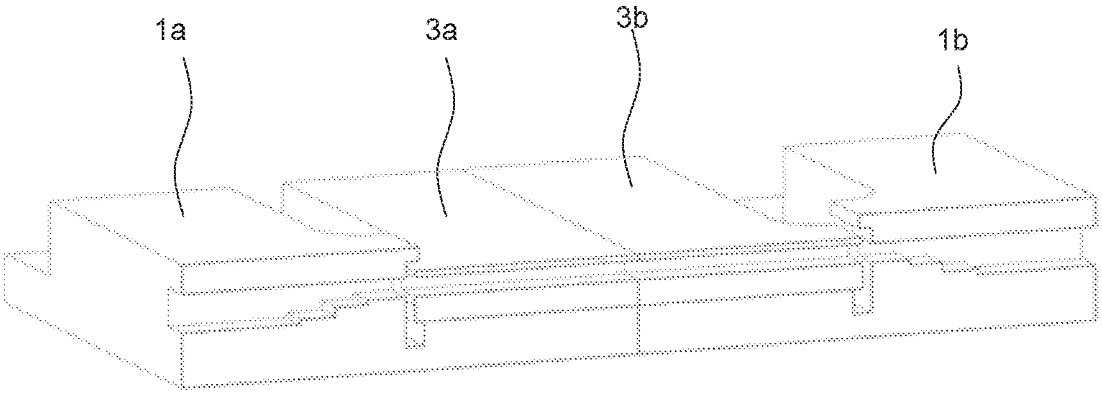

FIGS. 13*a* and 13*b* show that a waveguide transition may further comprise several metalized waveguide interfaces 1*a*, 1*b* and/or chip-level waveguides 3*a*, 3*b*. FIG. 13*a* shows a waveguide transition 40 from a chip-level waveguide to a standardized waveguide utilizing a waveguide interfaces shown with the geometry forming "pipes", i.e. the first and the second RF-chokes, to cancel unwanted RF-propagation.

Hence, according to aspects, the waveguide transition 40 may comprise at least two metalized waveguide interfaces 1*a*, 1*b*.

According to aspects, at least two waveguide interfaces are connected in series. In one exemplary design two metalized waveguide interfaces are cascaded.

According to further aspects, the waveguide transition 40 may comprise at least two metalized chip-level waveguides 3*a*, 3*b*.

According to aspects, at least two chip-level waveguides 3*a*, 3*b* are connected in series. In one exemplary design two chip-level waveguides are cascaded.

FIG. 13*b* further shows the abovementioned tapered waveguided. Hence, the cross section of the transition from the waveguide integrated on die level to the metal waveguide is shown with integrated impedance transformer to match the smaller waveguide height in the die compared to standard waveguide flange.

In both FIG. 13*a* and FIG. 13*b*, the chips indicated by 3*a* and 3*b* can be one chip physically, i.e., 3*a* and 3*b* connected in back-to-back configuration and manufactured in one piece.

Thus, it is provided a solution to situations where the waveguide openings to be connected are of different dimensions.

Exemplified herein are waveguides with rectangular openings. However, the inventive concept as such, i.e. the waveguide interface providing for a non-galvanic transition by introducing an airgap and radio frequency, RF, chokes, when a chip-level waveguide is connected to it, is applicable to other geometries as well, e.g. waveguides with circular waveguide opening.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following embodiments. Thus, the disclosure should be regarded as illustrative rather than restrictive, and not as being limited to the particular aspects discussed above.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments.

The examples discussed! herein were chosen and described in order to explain the principles and the nature of various example embodiments and its practical application to enable one skilled person in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed. It should further be noted that any reference signs do not limit the scope of the embodiments.

LIST OF EXAMPLES

1. A metalized waveguide interface (1) for providing a galvanically isolated waveguide connection for a propagating signal, between a standardized waveguide (2) and a, to the standardized waveguide non-compatible, metalized chip-level waveguide (3), the metalized waveguide interface comprising;
   - a support part (4) comprising a support surface (5) for mounting the metalized chip-level waveguide (3);
   - a transition part (6) comprising a first surface portion (7), a second surface portion (8), a third surface portion (9) and a fourth surface portion (10), wherein
     - the fourth surface portion (10) comprises a first rectangular waveguide opening (11) compatible connectable to a waveguide opening of the standardized waveguide (2);
     - the third surface portion (9) comprises a second rectangular waveguide opening (12) having dimensions comprising a first side (13), a second side (14), a third side (15) and a fourth side (16), wherein
       - the first side (13) and the third side (15) are parallel to each other;
       - the second side (14) and the fourth side (16) are parallel to each other and to the first surface portion (7) and the second surface portion (8);
       - the fourth side (16) is arranged closest to the second surface portion (8); and
       - the dimensions match dimensions of a waveguide opening of the metalized chip-level waveguide (3);
     - the third surface portion (9) extends in a first direction d1 from the first side (13) and parallel to the fourth side (16) and in a second direction d2 from the third side (15) and parallel to the fourth side (16), such that a first open-ended waveguide (31) and a second open-ended waveguide (32) is obtained along the directions d1 and d2, respectively, when the metalized chip-level waveguide (3) is mounted on the support surface (5);
   - a trench comprising a recess (18) in the metalized waveguide interface (1) extending at least between the first side (13) and the third side (15) and in a direction d3 towards the support part (4) and perpendicular to the second rectangular waveguide opening (12), the recess (18) separating the transition part (6) and the support part (4), such that a short-circuit waveguide (34) is obtained when the metalized chip-level waveguide (3) is mounted on the support surface (5);

an extended portion (19) comprising an extension of the first surface portion extending at least between the first side (13) and the third side (15) and in the direction d3, such that third open-ended waveguide (33) is obtained when the metalized chip-level waveguide (3) is mounted on the support surface (5).

2. The metalized waveguide interface (1) according to example 1, wherein the first open-ended waveguide (31), the second open-ended waveguide (32) and the third open-ended waveguide each has an effective electrical length (33) and wherein the effective electrical length of at least one of the first open-ended waveguide (31), the second open-ended waveguide (32) or the third open-ended waveguide corresponds to a phase shift of the propagating signal of approximately $\pi/2+n\pi$ (n is an integer equal or greater to zero).

3. The metalized waveguide interface (1) according to any of the preceding examples, wherein an effective electrical length of the short-circuit waveguide (34) corresponds to a phase shift of the propagating signal of approximately $\pi+n\pi$ (n is an integer equal or greater to zero).

4. The metalized waveguide interface (1) according to any of the preceding examples, wherein the first side (13) and the third side (15) each have a length corresponding to a phase shift of the propagating signal of approximately $\pi/2+n\pi$ (n is an integer equal or greater to zero).

5. The metalized waveguide interface (1) according to any of the preceding examples, wherein the second side (14) and the fourth side (16) each have a length corresponding to a phase shift of the propagating signal of approximately $\pi+n\pi$ (n is an integer equal or greater to zero).

6. The metalized waveguide interface (1) according to any of the preceding examples, wherein at least one of the third open-ended waveguide (33) or the short-circuit waveguide (34) comprise a bend.

7. The metalized waveguide interface (1) according to any of the preceding examples, wherein at least one of the first open-ended waveguide (31), the second open-ended waveguide (32), the third open-ended waveguide (33) or the short-circuit waveguide (34) is a radio frequency, RF, choke.

8. The metalized waveguide interface (1) according to any of the preceding examples, further comprising a tapered waveguide between the first waveguide opening (11) and the second waveguide opening (12).

9. The metalized waveguide interface (1) according to any of the preceding examples, wherein the propagating signal has a frequency in the range of 30 GHz-300 GHz, or in the range 110 GHz-170 GHz or of approximately 140 GHz.

10. A waveguide transition (40) comprising:

at least one of the metalized waveguide interfaces (1) according to any of the examples 1-9 and at least one metalized chip-level waveguide (3) comprising a first surface portion (41) and a second surface portion (42), the second surface portion (42) comprising a third rectangular waveguide opening (43) with dimensions matching the dimensions of the second waveguide opening (12) of the metalized waveguide interface (1), and wherein the metalized chip-level waveguide (3) is mounted such that the support surface (5) and the first surface portion of the metalized chip-level waveguide (41) are galvanically connected;

the second and the third waveguide openings (12,43) are aligned and facing each other; and a gap (44) separates the second surface portion of the metalized chip-level waveguide (42) and the third surface portion of the metalized waveguide interface (9) such that a galvanically isolated waveguide connection is obtained.

11. The waveguide transition (40) according to any of the examples 10-11, wherein the propagating signal has a wavelength and wherein the gap is much less than the wavelength.

12. The waveguide transition (40) according to example 12, wherein the gap is:

a. less or equal to 200 micrometer, or
b. less or equal to 100 micrometer, or
c. less or equal to 40 micrometer, or
d. less or equal to 20 micrometer, or
e. less or equal to 10 micrometer.

13. The waveguide transition (40) according to any of the examples 10-13, wherein the metalized chip-level waveguide is micromachined.

14. The waveguide transition (40) according to any of the examples 10-14, wherein at least two waveguide interfaces are connected in series.

15. The waveguide transition (40) according to any of the examples 10-15, wherein at least two chip-level waveguides are connected in series.

The invention claimed is:

1. A metalized waveguide interface for providing a galvanically isolated waveguide connection between a first waveguide and a second waveguide, the second waveguide being a metalized chip-level waveguide having a rectangular chip-level waveguide opening, the metalized waveguide interface comprising;

a support part comprising a support surface for mounting the second waveguide;

a transition part comprising a first face comprising a first rectangular waveguide opening, connectable to a waveguide opening of the first waveguide, and further comprising a second face comprising a second rectangular waveguide opening, in communication with the first rectangular waveguide opening through a cavity in the transition part; and a connecting part connecting the support part to the transition part so as to space apart the support part and the transition part, with a trench between an edge of the support surface closest to the second face of the transition part and the second face of the transition part;

wherein the support part, transition part, and connecting part are arranged so that when the second waveguide is mounted to the support surface with the rectangular chip-level waveguide opening facing the second rectangular waveguide opening across the trench, first, second, and third open-ended waveguides and a short-circuit waveguide are formed by the second face of the transition part, the second waveguide, and the trench, the first and second open-ended waveguides extending along the trench, away from opposite first and third sides of the second rectangular waveguide opening, respectively, and the third open-ended waveguide extending away from a second side of the second rectangular waveguide opening in a direction away from the trench, and the short-circuit waveguide extending from a fourth side of the second rectangular waveguide opening, opposite the second side, in a direction into the trench.

2. The metalized waveguide interface of claim 1, further comprising an extended portion comprising an extension of the transition part, from the second face, the extended portion extending at least between the first side and the second side and in a direction across the trench, such that the third open-ended waveguide comprises a bend.

3. The metalized waveguide interface of claim 1, wherein the first, the second, and the third open-ended waveguides each have an effective electrical length and wherein the effective electrical length of at least one of the first, the second or the third open-ended waveguides corresponds to a phase shift of a propagating signal at a design frequency for the first and second waveguides of approximately $\pi/2+n\pi$, where n is an integer equal or greater to zero.

4. The metalized waveguide interface of claim 1, wherein an effective electrical length of the short-circuit waveguide corresponds to a phase shift of a propagating signal at a design frequency for the first and second waveguides of approximately $\pi+n\pi$, where n is an integer equal or greater to zero.

5. The metalized waveguide interface of claim 1, wherein the first side and the third side are shorter than the second side.

6. The metalized waveguide interface of claim 1, wherein the first side and the second side each have a length corresponding to a phase shift of the propagating signal of approximately $\pi/2+n\pi$, where n is an integer equal or greater to zero.

7. The metalized waveguide interface of claim 1, wherein the second side and the fourth side each have a length corresponding to a phase shift of a propagating signal at a design frequency for the first and second waveguides of approximately $\pi+n\pi$, where n is an integer equal or greater to zero.

8. The metalized waveguide interface of claim 1, wherein the short-circuit waveguide comprises a bend.

9. The metalized waveguide interface of claim 1, wherein at least one of the first, second, and third open-ended waveguides and the short-circuit waveguide is a radio frequency (RF) choke.

10. The metalized waveguide interface of claim 1, further comprising a tapered waveguide between the first rectangular waveguide opening and the second rectangular waveguide opening.

11. A metalized waveguide interface for providing a galvanically isolated waveguide connection between a first waveguide and a second waveguide, the second waveguide being a metalized chip-level waveguide having a rectangular chip-level waveguide opening, the metalized waveguide interface comprising;

a support part comprising a support surface for mounting the second waveguide;

a transition part comprising:

a first surface portion comprising a first rectangular waveguide opening connectable to a waveguide opening of the first waveguide;

a second surface portion comprising a second rectangular waveguide opening having dimensions that match dimensions of the rectangular chip-level waveguide opening of the second waveguide, the second surface portion extending in a first direction d1 from the second rectangular waveguide opening to a first side of the second surface portion and in a second direction d2 from the second rectangular waveguide opening to a third side of the second surface portion, opposite and parallel to the first side, such that a first open-ended waveguide and a second open-ended q waveguide are obtained along the directions d1 and d2, respectively, when the second waveguide is mounted on the support surface, with the rectangular chip-level waveguide opening of the second waveguide facing the second rectangular waveguide opening across a gap, and the second surface portion further extending in a fourth direction d4 from the second rectangular waveguide opening to a second side of the second surface portion, perpendicular to the first and third side, such that a third open-ended waveguide is obtained between the second surface portion and the second waveguide when the second waveguide is mounted on the support surface; and a trench in a portion of the metalized waveguide interface connecting the transition part and the support part, the trench comprising a recess adjacent the second surface portion and extending at least between the first side and the third side and further extending in a direction d3 perpendicular to the second rectangular waveguide opening, towards the support part, the recess separating the transition part and the support part such that a short-circuit waveguide extending into the recess from the second rectangular waveguide opening and the rectangular chip-level waveguide opening is obtained when the second waveguide is mounted on the support surface.

12. The metalized waveguide interface of claim 11, further comprising an extended portion comprising an extension of the transition part, from the second surface portion, the extended portion extending at least between the first side and the second side and in the direction d3, such that the third open-ended waveguide comprises a bend.

13. The metalized waveguide interface of claim 11, wherein the first, the second, and the third open-ended waveguides each have an effective electrical length and wherein the effective electrical length of at least one of the first, the second or the third open-ended waveguides corresponds to a phase shift of a propagating signal at a design frequency for the first and second waveguides of approximately $\pi/2+n\pi$, where n is an integer equal or greater to zero.

14. The metalized waveguide interface of claim 11, wherein an effective electrical length of the short-circuit waveguide corresponds to a phase shift of a propagating signal at a design frequency for the first and second waveguides of approximately $\pi+n\pi$, where n is an integer equal or greater to zero.

15. The metalized waveguide interface of claim 11, wherein the first side and the third side are shorter than the second side.

16. The metalized waveguide interface of claim 11, wherein the first side and the third side each have a length corresponding to a phase shift of the propagating signal of approximately $\pi/2+n\pi$, where n is an integer equal or greater to zero.

17. The metalized waveguide interface of claim 11, wherein the second side and the fourth side each have a length corresponding to a phase shift of a propagating signal at a design frequency for the first and second waveguides of approximately $\pi+n\pi$, where n is an integer equal or greater to zero.

18. The metalized waveguide interface of claim 11, wherein the short-circuit waveguide comprises a bend.

19. The metalized waveguide interface of claim 11, wherein a design frequency for the first and second waveguides has a frequency in the range of 30 GHz-300 GHz, or in the range 110 GHz-170 GHz or of approximately 140 GHz.

20. A waveguide transition comprising the metalized waveguide interface of claim 10, further comprising at least one metalized chip-level waveguide comprising a first surface portion and a second surface portion, the second surface portion comprising a third rectangular waveguide opening with dimensions matching the dimensions of the second waveguide opening of the metalized waveguide interface, and wherein the second waveguide is mounted such that the support surface and the first surface portion of the second waveguide are galvanically connected;

the second and the third waveguide openings are aligned and facing each other; and a gap separating the second surface portion of the second waveguide and the third surface portion of the metalized waveguide interface such that a galvanically isolated waveguide connection is obtained.

* * * * *